US012755366B1

(12) United States Patent
Hever et al.

(10) Patent No.: US 12,755,366 B1
(45) Date of Patent: Oct. 6, 2026

(54) EVALUATION OF AN ELECTRIC VEHICLE BATTERY

(71) Applicant: UVeye Ltd., Tel Aviv (IL)

(72) Inventors: Amir Hever, Tenafly, NJ (US); Itai Orr, Or Akiva (IL)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 19/416,032

(22) Filed: Dec. 11, 2025

(51) Int. Cl.
*G06T 7/00* (2017.01)
*G01N 29/44* (2006.01)

(52) U.S. Cl.
CPC ....... *G06T 7/0004* (2013.01); *G01N 29/4481* (2013.01); *G06T 2207/10028* (2013.01); *G06T 2207/10048* (2013.01); *G06T 2207/20081* (2013.01); *G06T 2207/20084* (2013.01)

(58) Field of Classification Search
CPC ......... G06T 7/0004; G06T 2207/30268; G06T 2207/20081; G06T 2207/20084; G06T 2207/10048; G06T 2207/10028; G01N 2021/8887; G01N 21/8851; G01N 22/02; G01N 27/82; G01N 29/4481; G06V 10/806
See application file for complete search history.

(56) References Cited

U.S. PATENT DOCUMENTS 11,549,919 B2 * 1/2023 Steingart ................ G01N 29/46
12,511,598 B1 * 12/2025 Shah ................ G06Q 10/06313

FOREIGN PATENT DOCUMENTS

WO WO-2025052491 A1 * 3/2025 ............ G01N 29/11

OTHER PUBLICATIONS

Li H, Wang X, Yang Z, Ali S, Tong N, Baseer S. Correlation-Based Anomaly Detection Method for Multi-sensor System. Comput Intell Neurosci. May 31, 2022;2022:4756480. doi: 10.1155/2022/4756480. (Year: 2022).*

Liu H, Li C, Hu X, Li J, Zhang K, Xie Y, Wu R, Song Z. Multi-modal framework for battery state of health evaluation using open-source electric vehicle data. Nat Commun. Jan. 29, 2025;16(1):1137. doi: 10.1038/s41467-025-56485-7. (Year: 2025).*

Zhan, X.; Li, Z.; Chen, H.; Yu, G.; Li, X. Optimization and Application of Electromagnetic Ultrasonic Transducer for Battery Non-Destructive Testing. Sensors 2025, 25, 6003. https://doi.org/10.3390/s25196003 (Year: 2025).*

* cited by examiner

*Primary Examiner* — Amandeep Saini
*Assistant Examiner* — Jaspreet Kaur

(57) ABSTRACT

There is provided a system for non-destructive contact-less evaluation of an electric vehicle (EV) battery of an electric vehicle, comprising: an electromagnetic (EM) transducer(s), an acoustic transducer(s), a thermal camera(s), and a processor(s) configured for: operating the EM transducer(s) and the acoustic transducer(s) for generating EM radiation and acoustic energy towards the EV battery, operating the EM transducer(s), and the acoustic transducer(s) for intercepting EM radiation and acoustic energy reflected off the EV battery and/or passing through the EV battery, operating the thermal camera(s) for capturing a thermal image(s) of the vehicle, extracting features from the intercepted EM radiation, the acoustic energy, and the thermal image(s), generating a multi-dimensional dataset by aggregating the features, feeding the multi-dimensional dataset into a machine learning model, and obtaining from the machine learning model, an indication of an anomaly in the EV battery.

21 Claims, 3 Drawing Sheets

EVALUATION OF AN ELECTRIC VEHICLE BATTERY

BACKGROUND

The present invention, in some embodiments thereof, relates to an electric vehicle battery and, more specifically, but not exclusively, to systems and methods for evaluation of an electric vehicle (EV) battery.

Evaluation of an electric vehicle (EV) battery typically considers:

Capacity & State of Charge (SoC): how much energy it can store and deliver.

State of Health (SoH): degradation, cycle life, and remaining usable capacity.

Power capability: ability to deliver/accept current for acceleration and fast charging.

Thermal performance: heat generation, cooling efficiency, and safety under load.

Efficiency & diagnostics: internal resistance, voltage response, and fault detection.

SUMMARY

According to a first aspect, a system for non-destructive contact-less evaluation of an electric vehicle (EV) battery of an electric vehicle, comprises: at least one electromagnetic (EM) transducer configured for generating EM radiation and for intercepting the EM radiation, at least one acoustic transducer configured for generating acoustic energy towards the EV battery and for intercepting the acoustic energy reflected off the EV battery or passing through the EV battery, at least one thermal camera, a data interface configured to access and/or receive the intercepted EM radiation and the intercepted acoustic radiation, and at least one processor configured for: operating the at least one EM transducer and the at least one acoustic transducer for generating EM radiation and acoustic energy towards the EV battery, operating the at least one EM transducer, and the at least one acoustic transducer for intercepting EM radiation and acoustic energy reflected off the EV battery and/or passing through the EV battery, operating the at least one thermal camera for capturing at least one thermal image of the vehicle, extracting a plurality of features from the intercepted EM radiation, the acoustic energy, and the at least one thermal image, generating a multi-dimensional dataset by aggregating the plurality of features, feeding the multi-dimensional dataset into a machine learning model, and obtaining from the machine learning model, an indication of an anomaly in the EV battery.

According to a second aspect, a computer implemented method of non-destructive contact-less evaluation of an EV battery of an electric vehicle, comprises: operating at least one EM transducer and at least one acoustic transducer for generating EM radiation and acoustic energy towards the EV battery, operating the at least one EM transducer and the at least one acoustic transducer for intercepting EM radiation and acoustic energy reflected off the EV battery or passing through the EV battery, operating at least one thermal camera for capturing at least one thermal image of the vehicle, extracting a plurality of features from the intercepted EM radiation, the acoustic energy, and the at least one thermal image, generating a multi-dimensional dataset by aggregating the plurality of features, feeding the multi-dimensional dataset into a machine learning model, and obtaining from the machine learning model, an indication of an anomaly in the EV battery.

According to a third aspect, a system for training a machine learning model, comprises: at least one electromagnetic (EM) transducer configured for generating EM radiation and for intercepting the EM radiation, at least one acoustic transducer configured for generating acoustic energy towards an EV battery installed within a vehicle and for intercepting the acoustic energy reflected off the EV battery or passing through the EV battery, at least one thermal camera, a data interface configured to access and/or receive the intercepted EM radiation and the intercepted acoustic radiation, and at least one processor configured for: generating training dataset comprising a plurality of records for a plurality of sample vehicles each with a sample EV battery installed therein, each record generated by: operating the at least one EM transducer and the at least one acoustic transducer for generating EM radiation and acoustic energy towards the sample EV battery, operating the at least one EM transducer, and the at least one acoustic transducer for intercepting EM radiation and acoustic energy reflected off the sample EV battery or passing through the sample EV battery, operating the at least one thermal camera for capturing at least one thermal image of the sample vehicle, extracting a plurality of features from the intercepted EM radiation, the acoustic energy, and the at least one thermal image, generating a multi-dimensional dataset by aggregating the plurality of features, and defining a ground truth indicating whether the sample EV battery of the sample electric vehicle has an anomaly or not, and training a machine learning model on the training dataset.

In a further implementation form of the first, second, and third aspects, the at least one processor is further configured for: in response to the EV battery having the anomaly, at least one of: automatically ordering a replacement EV battery, automatically scheduling a service appointment for the EV battery, and performing at least one additional evaluation of the EV battery based on electrical and/or mechanical contact with the EV battery.

In a further implementation form of the first, second, and third aspects, the at least one processor is further configured for: in response to the EV battery not having the anomaly, automatically scheduling a future EV battery screening session.

In a further implementation form of the first, second, and third aspects, the machine learning model generates a risk of failure of the EV battery.

In a further implementation form of the first, second, and third aspects, the machine learning model generates a prediction for a future time interval during which the EV battery is predicted to develop the anomaly requiring service or replacement, and at least one of: automatically ordering the replacement EV battery for availability at or prior to the future time interval, and automatically scheduling the service appointment for the EV battery at or prior to the future time interval.

In a further implementation form of the first, second, and third aspects, further comprising training the machine learning model on a training dataset of a plurality of records generated for a plurality of sample electric vehicles, wherein a record includes the multi-dimensional dataset computed for a sample electric vehicle, and a ground truth indicating whether the EV battery of the sample electric vehicle has the anomaly.

In a further implementation form of the first, second, and third aspects, the ground truth of the record further includes a first timestamp indicating when the multi-dimensional dataset was generated and when the EV battery did not include an anomaly at the first timestamp, including a second timestamp indicating a future time when the anomaly developed in the EV battery.

In a further implementation form of the first, second, and third aspects, the at least one processor is further configured for: operating the at least one EM transducer over a time interval during which the electric vehicle is in motion relative to the at least one EM transducer, computing a plurality of datasets of the intercepted EM radiation during the time interval by performing synthetic aperture radar (SAR) processing, and computing at least one field variation map by processing the plurality of datasets, wherein the plurality of features for generating the multi-dimensional dataset include the at least one field variation map.

In a further implementation form of the first, second, and third aspects, the at least one processor is further configured for: operating a phased array at about 24 gigahertz (GHz) and 77 GHz for electronically scanning to automatically tracking the motion of the electric vehicle relative to the at least one EM transducer, wherein the SAR processing is based on the tracking by the phased array, operating an actuator configured for moving the at least one EM transducer for maintaining the at least one EM transducer at a preselected distance from the electric vehicle during the motion, processing the plurality of datasets by a motion-compensated imaging process for enhancing resolution of the plurality of datasets, and computing a 3D reconstruction of at least the EV battery based on the plurality of datasets.

In a further implementation form of the first, second, and third aspects, the at least one processor is configured for: operating the at least one acoustic transducer over a time interval during which the electric vehicle is in motion relative to the at least one acoustic transducer, for generating vibrations by the motion of the electric vehicle for exciting latent defects in the EV battery, wherein the at least one acoustic transducer intercepts the acoustic energy while the electric vehicle is in motion, wherein the plurality of features extracted from the acoustic energy intercepted while the electric vehicle is in motion include abnormal acoustic signatures.

In a further implementation form of the first, second, and third aspects, the at least one processor is configured for: operating the at least one thermal camera over a time interval during which the electric vehicle is in motion relative to the at least one thermal camera for capturing a plurality of thermal images at a plurality of viewing angles, wherein the plurality of features extracted from the plurality of thermal images include detected hot spots indicative of identified cells of the EV battery with high internal resistance.

In a further implementation form of the first, second, and third aspects, the plurality of features extracted from the intercepted acoustic energy include abnormal acoustic signatures extracted by an AI pattern recognition model.

In a further implementation form of the first, second, and third aspects, the plurality of features extracted from a plurality of thermal images include temperature patterns correlated with risk of failure of the EV battery.

In a further implementation form of the first, second, and third aspects, the anomaly, detected by analyzing the intercepted EM radiation, is selected from: internal cell imbalances and/or connection failures.

In a further implementation form of the first, second, and third aspects, the at least one EM transducer is configured for generating low frequency EM radiation selected for penetrating a pack casing of the EV battery.

In a further implementation form of the first, second, and third aspects, the generated EM radiation is in a range of about 1-100 kiloHertz (kHz).

In a further implementation form of the first, second, and third aspects, the at least one acoustic transducer is configured for generating acoustic energy selected for detecting battery stress sounds due to battery cell anomalies.

In a further implementation form of the first, second, and third aspects, the at least one acoustic transducer is configured for generating acoustic energy in a range of about 20-100 kHz.

In a further implementation form of the first, second, and third aspects, further comprising calibrating at least one of: the at least one EM transducer, the at least one acoustic transducer, and the at least one thermal camera, for increasing a confidence score of the anomaly detected by the machine learning model above a threshold.

In a further implementation form of the first, second, and third aspects, the sample vehicle is in motion with respect to the at least one EM transducer, the at least one acoustic transducer, and the at least one thermal camera.

In a further implementation form of the first, second, and third aspects, the ground truth of the record further includes a first timestamp indicating when the multi-dimensional dataset was generated and a second timestamp indicating when the anomaly developed in the sample EV battery.

In a further implementation form of the first, second, and third aspects, the ground truth of the record further includes a first timestamp indicating when the multi-dimensional dataset was generated and when the EV battery did not include an anomaly at the first timestamp, including a second timestamp indicating a future time when the anomaly developed in the EV battery.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
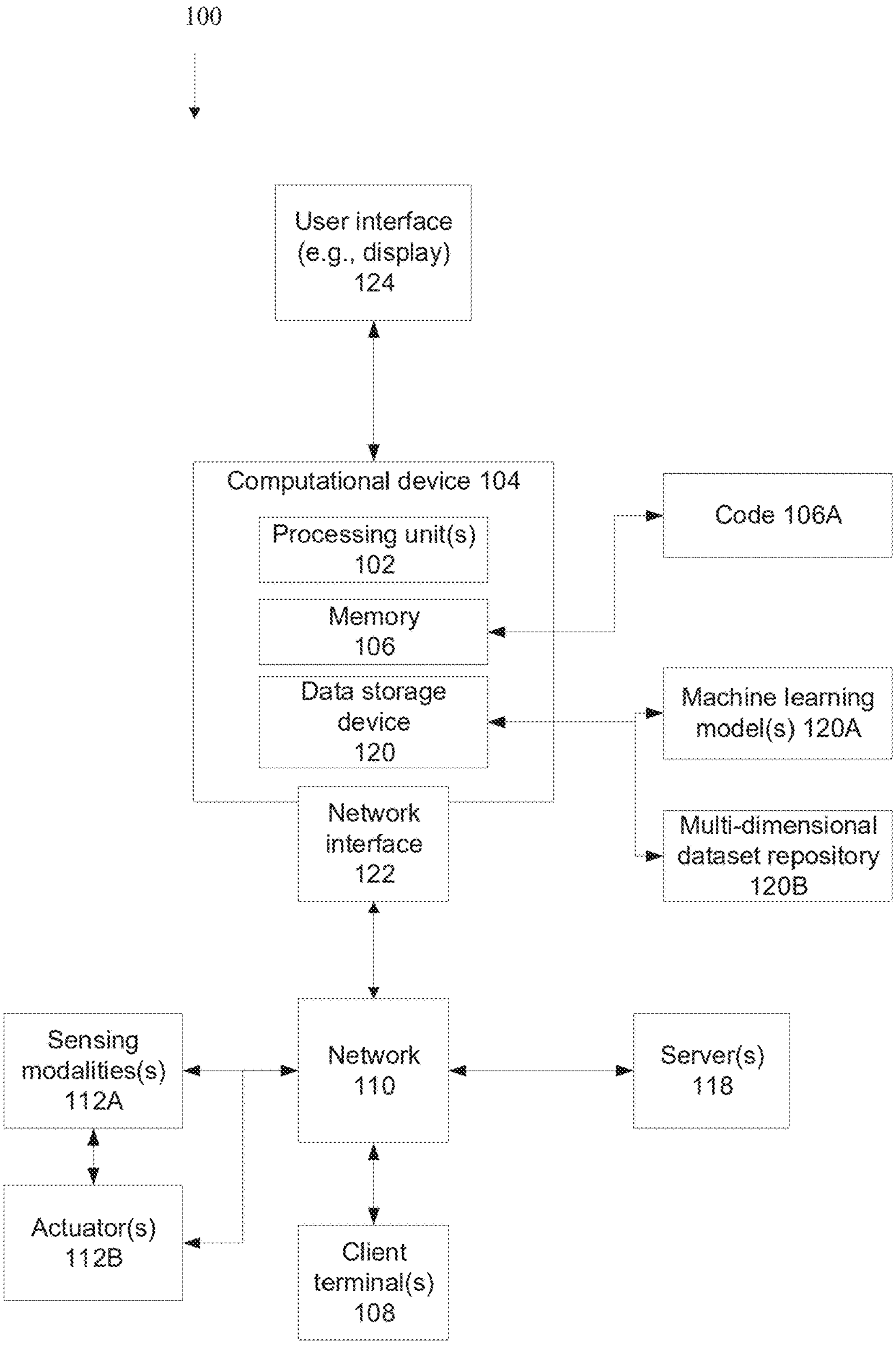
FIG. 1 is a block diagram of components of a system for automatically detecting an anomaly of an EV battery, in accordance with some embodiments of the present invention.

The present invention, in some embodiments thereof, relates to an electric vehicle battery and, more specifically, but not exclusively, to systems and methods for evaluation of an electric vehicle battery.

As used herein, the term vehicle may refer to a car, for example, sedan, sports car, minivan, SUV, and the like. However, it is to be understood that embodiments described herein may be used to detect anomalies in other types of vehicles, for example, buses, hulls of boats, and aircraft.

An aspect of some embodiments of the present invention relates to systems, methods, computing devices, and/or code instructions (stored on a data storage device and executable by one or more processors) for non-destructive contact-less evaluation of an electric vehicle (EV) battery of an electric vehicle. At least one EM transducer is operated for generating EM radiation (also referred to herein as EM energy) towards the EV battery. At least one acoustic transducer is operated for generating acoustic energy towards the EV battery. The EM transducer(s) and the acoustic transducer(s) are operated for intercepting EM radiation and acoustic energy reflected off the EV battery and/or passing through the EV battery. At least one thermal camera is operated for capturing at least one thermal image of the vehicle. Multiple features are extracted from the intercepted EM radiation, the acoustic energy, and the thermal image(s). A multi-dimensional dataset may be generated by aggregating the extracted features. The multi-dimensional dataset may be fed into a machine learning model. An indication of an anomaly in the EV battery is obtained from the machine learning model.

Optionally, the EM transducer(s) and/or acoustic transducer(s) and/or thermal camera(s) are operated while the electric vehicle is in motion relative to the EM transducer(s) and/or acoustic transducer(s) and/or thermal camera(s). The vehicle may be moving relative to stationary EM transducer(s) and/or acoustic transducer(s) and/or thermal camera(s) (e.g., the vehicle may be automatically moved such as by a conveyor belt), and/or the vehicle may be stationary while the EM transducer(s) and/or acoustic transducer(s) and/or thermal camera(s) are moved (e.g., position and/or view and/or pose), such as by one or more actuators.

In at least one embodiment, approaches based on the ML model are used for screening the EV battery for anomalies, rather than providing an absolute detection. EV batteries identified by the ML model as likely having anomalies may be flagged for more specific testing, such as by contact-based testing. The ML model may detect external symptoms correlated with anomalies in the EV batteries rather than directly detecting the anomalies in the EV batteries. The sensing and/or extracted features may be for sensing the indirect symptoms correlated with anomalies in the EV batteries. For example, heating and/or vibration patterns appearing on the surface of the casing of the EV battery, and/or in components in proximity to the EV battery.

An aspect of some embodiments of the present invention relates to systems, methods, computing devices, and/or code instructions (stored on a data storage device and executable by one or more processors) for training a machine learning model. A training dataset of multiple records for multiple sample vehicles each with a sample EV battery installed therein, is generated. Each record is generated as follows. At least one EM transducer is operated for generating EM radiation towards the sample EV battery. At least one acoustic transducer is operated for generating acoustic energy towards the sample EV battery. The EM transducer(s) and the acoustic transducer(s) are operated for intercepting EM radiation and/or acoustic energy reflected off the sample EV battery and/or passing through the sample EV battery. At least one thermal camera is operated for capturing at least one thermal image of the sample vehicle. Multiple features are extracted from the intercepted EM radiation, the acoustic energy, and the thermal image(s). A multi-dimensional dataset is generated by aggregating the extracted features. A ground truth indicating whether the sample EV battery of the sample electric vehicle has an anomaly or not may be defined. The machine learning model is trained on the training dataset.

Examples of anomalies (of the electric vehicle battery) which may be detected using one or more embodiments described include:

- Electrical anomalies, for example:
  - Cell Imbalances: Voltage disparities between individual cells within the battery pack.
  - Internal Short Circuits: Unintended current paths between electrodes or cells, creating abnormal electromagnetic field distortions
  - Connection Failures: Loose bus bars connecting cells, corroded terminals reducing conductivity, and/or broken welds at cell interconnections.
- Thermal anomalies, for example:
  - Hot Spots: Individual cells exhibiting elevated internal resistance, generating excess heat.
  - Thermal Runaway Precursors: Gas generation within cells, electrolyte boiling, and/or cascading cell heating patterns.
  - Cooling System Failures: Blocked coolant channels, pump malfunctions, and/or uneven heat distribution across the pack.
- Mechanical/structural anomalies, for example:
  - Cell Swelling: Physical expansion of cells due to gas generation or electrolyte decomposition.
  - Structural Defects: Cracked battery housings, loose mounting hardware, and/or separator damage between cells. Internal Pressure Buildup: Elevated gas pressure within sealed cells.
- Electrochemical anomalies, for example:
  - Electrolyte Degradation: Chemical breakdown of electrolyte reducing ionic conductivity.
  - Separator Damage: Degradation or perforation of the physical barrier between anode and cathode.
- Electrical fault anomalies, for example:
  - Arcing/Sparking: Intermittent electrical discharge between conductors at different potentials.
  - Corroded Terminals: Oxidation at electrical contact points increasing contact resistance.
- Predictive anomaly detection, for example:
  - Pre-Failure Degradation States: Battery conditions that have not yet caused operational failure but indicate imminent failure.

At least one embodiment described herein addresses the technical problem of improving evaluation of an electric vehicle battery. At least one embodiment described herein improves the technology of electric vehicle batteries, by enabling contactless and/or non-destructive testing of electric vehicle batteries, optionally while the vehicle is moving. At least one embodiment described herein improves upon existing approaches for evaluation of electric vehicle batteries, which require contact with the electric vehicle battery and/or are destructive to the electric vehicle battery. Such existing evaluation approaches require significant amount of time to perform, require significant resources to perform, and/or are costly. At least one embodiment described herein provides the practical application of evaluating an electric vehicle battery without requiring physical contact with the electric vehicle battery (e.g., by a sensor and/or measurement device) and/or without being destructive to the electric vehicle battery. The EV battery may be screened for anomalies using at least one embodiment described herein. If the screen detects a likely anomaly, the EV battery may undergo additional testing via electrical and/or mechanical contact and/or via destructive approaches. The screening based on at least one embodiment reduces the number of EV batteries that undergo contact testing and/or destructive testing.

At least one embodiment described herein provides one or more of the following practical applications:

Improving performance of the electric vehicle and/or EV battery by performing a contactless and/or non-destructive screening for an anomaly in the EV battery.

A screening for batteries likely having anomalies may be performed by contactless and/or non-destructive screening described herein. Batteries found to likely have anomalies may then be tested using contact-based and/or destructive testing. The screening potentially reduces the number of batteries being testing using contact-based and/or destructive testing by reducing or eliminating unnecessary contact-based and/or destructive testing.

Improving utilization of resources that perform contact based and/or destructive testing of EV batteries by reducing the number of tests to EV batteries having anomalies found in the contactless and/or non-destructive screening.

Automatically ordering a replacement battery based on the contactless and/or non-destructive screening.

Automatically scheduling another future EV battery screening session based on the contactless and/or non-destructive screening.

Predicting future failure of the EV battery, and optionally taking action to avoid reaching a failure state of the EV battery, such as by pre-emptive repair and/or replacement of the EV battery.

At least one embodiment described herein addresses the aforementioned technical problem, and/or improves upon the aforementioned technical field and/or technology, and/or improves upon the aforementioned prior approaches, and/or provides one or more of the aforementioned the practical applications, by multiple sensing modalities that perform non-contact and/or non-destructive sensing of the EV battery, extraction of multiple features from the multi-modal sensing, generation of a multi-dimensional dataset by aggregating the multiple extracted features, and detecting an anomaly in the EV battery by analyzing the multi-dimensional dataset, optionally by feeding into a machine learning model. Exemplary sensing modalities include EM radiation generated by one or more EM transducers, acoustic energy generated by one or more acoustic transducers, and/or thermal image(s) captured by one or more thermal cameras. Optionally, the multi-modal sensing is performed during motion (e.g., relative motion) between the vehicle and the EM transducer(s) and/or acoustic transducer(s) and/or thermal camera(s).

The relative movement between the vehicle and the EM transducer(s) and/or acoustic transducer(s) and/or thermal camera(s) may improve the accuracy of the non-contact and/or non-destructive testing of the EV battery for anomalies, for example by:

Spatial sampling diversity-senses the EV battery at different poses, which may overlap. Different volumes of the EV battery may be evaluated at different poses, which provides more reliability to the aggregation of the data.

The features extracted from the sensing of the EV battery during motion of the vehicle (on its own efforts by driving rather than being pulled) may be different than the features extracted from the sensing of the EV battery while the vehicle is stationary, which may expose hidden abnormalities that are not apparent when the vehicle is stationary.

SAR processing and/or motion compensation may provide a high resolution mapping of abnormalities within the EV battery.

Motion of the vehicle may enable high throughput of screening vehicles for EV battery abnormalities.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
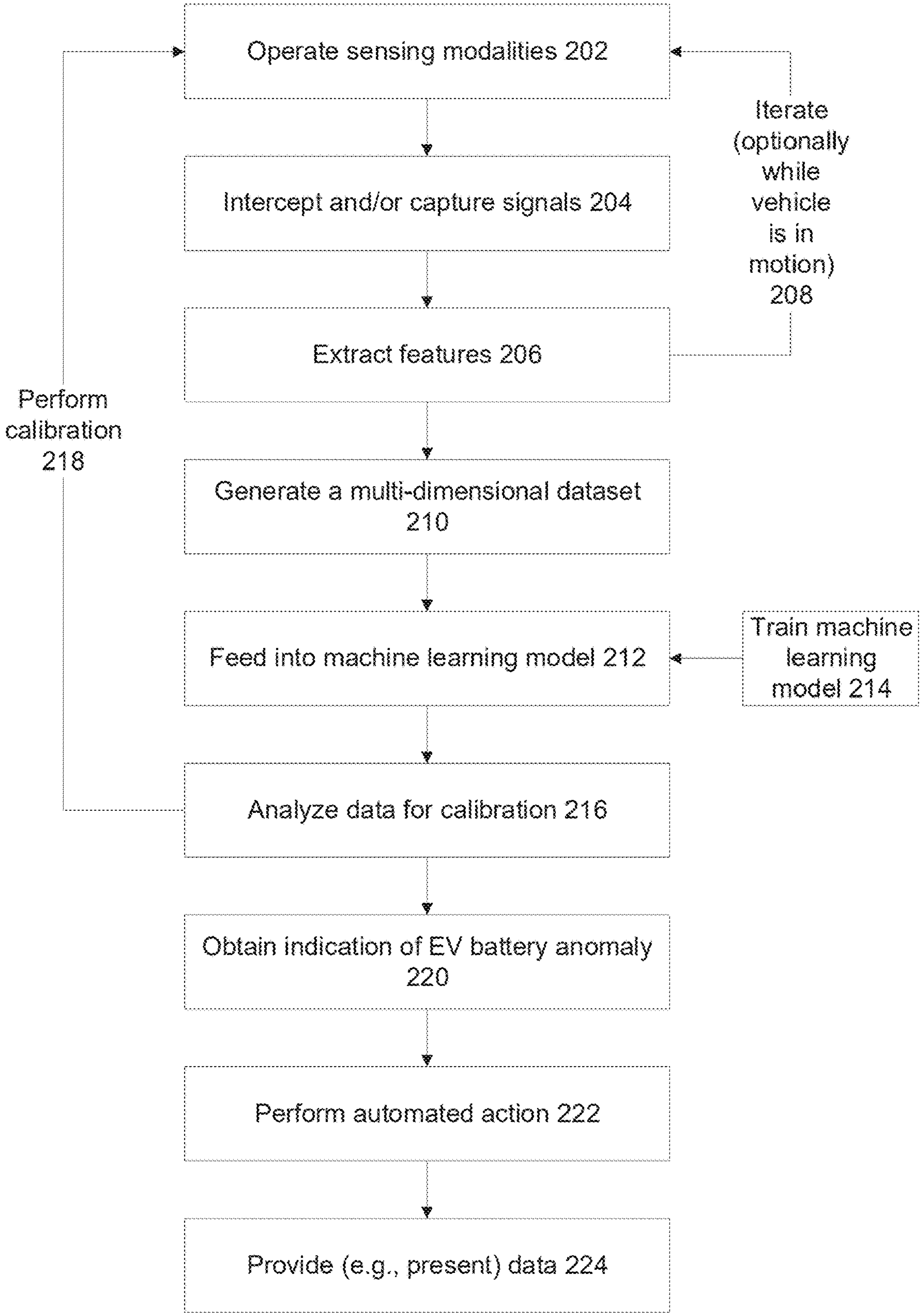
FIG. 2 is a flowchart of a method for non-destructive contact-less evaluation of an EV battery of an electric vehicle, in accordance with some embodiments of the present invention.
Figure 3:
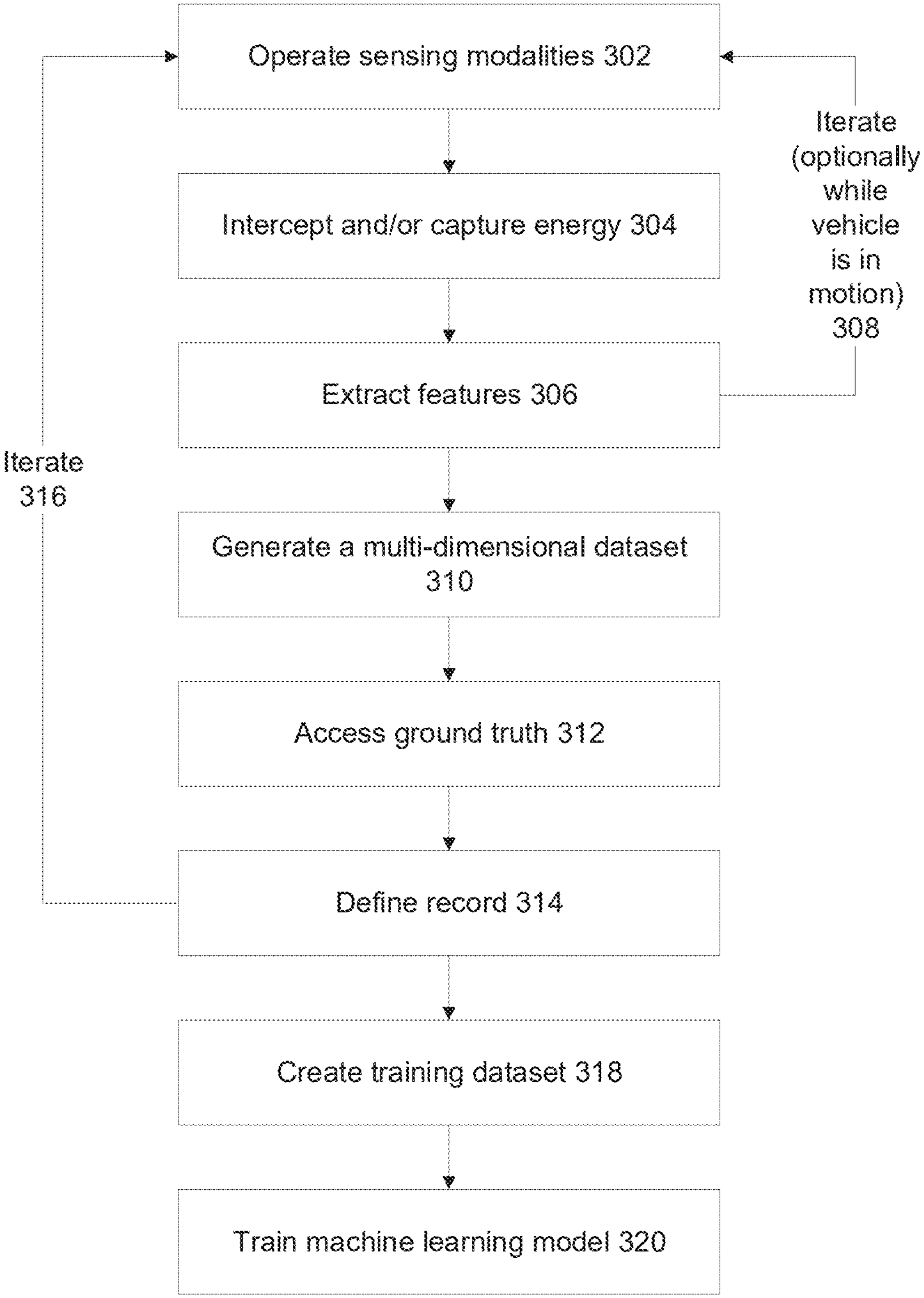
FIG. 3 is a flowchart of a method for training a machine learning model for non-destructive contact-less evaluation of an EV battery of an electric vehicle, in accordance with some embodiments of the present invention.

Reference is now made to FIG. 1, which is a block diagram of components of a system 100 for automatically detecting an anomaly of an EV battery, in accordance with some embodiments of the present invention. Reference is also made to FIG. 2, which is a flowchart of a method for non-destructive contact-less evaluation of an EV battery of an electric vehicle, in accordance with some embodiments of the present invention. Reference is also made to FIG. 3, which is a flowchart of a method for training a machine learning model for non-destructive contact-less evaluation of an EV battery of an electric vehicle, in accordance with some embodiments of the present invention.

Referring now back to FIG. 1, system 100 may implement the features of the method(s) described herein, for example with reference to FIGS. 2-3, by one or more hardware processors 102 of a computing device 104 executing code instructions stored in a memory (also referred to as a program store) 106.

System 100 may be referred to herein as a multi-modal EV battery anomaly detection system.

Computing device 104 may be implemented as, for example, a client terminal, a server, a virtual machine, a virtual server, a computing cloud, a group of interconnected computers, and the like.

Multiple architectures of system 100 based on computing device 104 may be implemented.

In an exemplary centralized implementation, computing device 104 storing code 106A may be implemented as one or more servers (e.g., network server, web server, a computing cloud, a virtual server) that provides services (e.g., one or more of the acts described with reference to FIGS. 2-3 and/or other methods described herein) to one or more servers 118 and/or client terminals 108 over a network 110, for example, providing software as a service (SaaS) to the servers 118 and/or client terminal(s) 108, providing software services accessible using a software interface (e.g., application programming interface (API), software development kit (SDK)), providing an application for local download to the servers 118 and/or client terminal(s) 108, and/or providing functions using a remote access session to the servers 118 and/or client terminal(s) 108, such as through a web browser and/or viewing application. Client terminals 108 may be located in different geographical locations, for example, different vehicle dealerships and/or different garages and/or different vehicle inspection centers. For example, client terminals 108 may send data of a vehicle locally captured by different sensing modalities 112, for example, EM transducers and/or acoustic transducers and/or thermal camera(s) which may be positioned at different views and/or while the vehicle is moving, to computing device 104. Computing device 104 may instruct changing of a pose of one or more sensing modalities 112 by operating one or more actuators 112B (e.g., motor, tilt mechanism, drive-belt, etc . . . ), for example, to change the position and/or view of one or more of the actuators. Alternatively or additionally, computing device 104 may instruct moving the vehicle by one or more actuators 112B (and/or other actuators not shown), for example, a drive-belt that moves the car along, and/or a motor that move a plate on which the car is positioned. Computing device 104 may instruct calibration of the different sensing modalities 112A, as described herein. Computing device 104 may detect an anomaly in the EV battery and/or predict failure (e.g., predict development of the anomaly) in the EV battery. Computing device 104 may perform other image processing and/or analysis as described herein. One or more outcomes described herein may be provided by computing device 104 to respective client terminals 108, for example, presenting the detected anomaly in the EV battery and/or presenting a prediction of when failure of the EV battery will occur.

In an exemplary localized implementation, code 106A is locally executed by computing device 104. For example, computing device 104 is installed in a local used vehicle dealership and connected to locally installed sensing modalities 112A. Data captured by sensing modalities 112A may be locally analyzed and/or processed as described herein. The pose (e.g., view and/or position) of one or more sensing modalities 112A may be locally performed. Outcomes described herein may be presented on a display associated with computing device 104.

Exemplary sensing modalities 112A include:

Electromagnetic (EM) transducer(s) that emit (i.e., generate) EM energy and/or intercept EM energy.

Acoustic transducer(s) that emit (i.e., generate) acoustic energy and/or intercept acoustic energy.

Thermal camera(s) that captures thermal images.

A phased array.

Sensing modalities 112A may transmit captured data (e.g., intercepted EM datasets, thermal images) to computing device 104, for example, via a direct connected (e.g., local bus and/or cable connection and/or short range wireless connection), and/or via a network 110 and a network interface 122 of computing device 104 (e.g., where sensing modalities 112A are connected via a wireless network, internet of things (IoT) technology and/or are located remotely from the computing device).

Network interface 122 may be implemented as, for example, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Memory 106 stores code instructions executable by hardware processor(s) 102. Exemplary memories 106 include a random access memory (RAM), read-only memory (ROM), a storage device, non-volatile memory, magnetic media, semiconductor memory devices, hard drive, removable storage, and optical media (e.g., DVD, CD-ROM). For example, memory 106 may store code 106A that execute one or more acts of the method described with reference to FIG. 2 and/or other methods described herein.

Computing device 104 may include data storage device 120 for storing data, for example, machine learning model(s) 120A for detecting and/or predicting anomalies of an EV battery, optionally in an input multi-dimensional dataset, multi-dimensional dataset repository 120B designed for storing multi-dimensional datasets created from acquired data, and/or other data described herein. Data storage device 120 may be implemented as, for example, a memory, a local hard-drive, a removable storage unit, an optical disk, a storage device, a virtual memory and/or as a remote server 118 and/or computing cloud (e.g., accessed over network 110).

Computing device 104 and/or client terminal(s) 108 include and/or are in communication with one or more physical user interfaces 124 that include a mechanism for inputting data and/or for viewing data, for example, a display for presenting data such an indication of whether an anomaly in detected and/or predicted in the EV battery and/or for entering data such as entering metadata of the vehicle. Exemplary user interfaces 124 include, for example, one or more of, a touchscreen, a display, a keyboard, a mouse, and voice activated software using speakers and microphone.

Referring now back to FIG. 2, at 202, multiple sensing modalities are operated for directing energy towards the EV battery.

The multiple sensing modalities are optionally operated simultaneously. Alternatively, the multiple sensing modalities are operated in close proximity to one another without overlap. For example, operating one type of sensing modality, turning off the sensing modality, operating a second sensing modality, etc . . . .

Exemplary sensing modalities are now described.

Optionally, at least one EM transducer is operated for generating EM radiation towards the EV battery. The EM transducer(s) may be designed and/or operated for generating low frequency EM radiation selected for penetrating a pack casing of the EV battery. Alternatively or additionally, the EM transducer(s) are operated for generating EM radiation for detecting external patterns of symptoms on the surface of the casing correlated with anomalies in the EV battery within the casing, for example, heat patterns, vibration patterns, and surface effects. Optionally, wherein the generated EM radiation is in a range of about 1-100 kiloHertz (kHz), or about 1-50 kHz, or about 51-100 kHz, or other values.

Alternatively or additionally, at least one acoustic transducer is operated for generating acoustic energy towards the EV battery. The at least one acoustic transducer may be designed and/or operated for generating acoustic energy selected for detecting battery stress sounds due to battery cell anomalies. Optionally, the at least one acoustic transducer generates acoustic energy in a range of about 20-100 kHz, or about 20-50 kHz, or about 51-100 kHz, or other values.

At 204, energy is intercepted and/or captured. The energy that is intercepted and/or captured may be generated by operating the sensing modalities. Alternatively or additionally, the energy that is intercepted and/or captured is not generated by operating the sensing modalities.

Optionally, the EM transducer(s) is operated for intercepting EM radiation reflected off the EV battery and/or passing through the EV battery. The EM radiation is generated by the EM transducer(s). The EM transducer(s) that generate the EM energy may be the same as the EM transducer(s) that intercept the EM energy. Alternatively, the EM transducer(s) that generate the EM energy is different from the EM transducer(s) that intercept the EM energy, for example, an EM transmitter generates the EM energy and an EM receiver intercepts the EM energy.

Alternatively or additionally, the acoustic transducer is operated for intercepting acoustic energy reflected off the EV battery and/or passing through the EV battery. The acoustic transducer(s) that generate the acoustic energy may be the same as the acoustic transducer(s) that intercept the acoustic energy. Alternatively, the acoustic transducer(s) that generate the acoustic energy is different from the acoustic transducer(s) that intercept the acoustic energy, for example, an acoustic transmitter generates the acoustic energy and an acoustic receiver intercepts the acoustic energy.

Alternatively or additionally, a thermal camera is operated for capturing one or more thermal images of the vehicle.

At 206, multiple features are extracted from the intercepted and/or captured energy.

Optionally, one or more features are extracted from each one of: the intercepted EM radiation, the acoustic energy, and the thermal image(s).

Optionally, the features extracted from the intercepted EM radiation are correlated with internal cell imbalances and/or connection failures.

Optionally, the features extracted from the intercepted acoustic energy include abnormal acoustic signatures correlated with abnormalities. The abnormal acoustic signatures may be extracted by an AI pattern recognition model. For example, a neural network (or other machine learning model architecture) is trained on a training dataset that includes intercepted acoustic energy from EV batteries with anomalies and EV batteries without anomalies. The trained neural network may generate an encoding of an input of intercepted acoustic energy, by accessing one or more hidden layers (i.e., prior to the last classification layer). The extracted features may include the encoding.

Optionally, the features extracted from the thermal image(s) include temperature patterns. The temperature patterns that are extracted may be selected based on a correlation with risk of failure of the EV battery. Alternatively or additionally, the features extracted from the thermal images include detected hot spots indicative of identified cells of the EV battery with high internal resistance. For example, temperature patterns may be analyzed for a first set of EV batteries with anomalies and a second set of EV batteries without anomalies, to detect patterns that are correlated with the first set and non-correlated with the second set.

At 208, one or more features described with reference to 202-206 may be iterated. The iterations may be performed over a time interval during which the electric vehicle is moving relative to transducer(s) and/or camera.

The iterations may be performed for selecting a different type of modality (e.g., the EM radiation, the acoustic energy, and the thermal images) at each iteration, when the multiple modalities are not simultaneously operated.

Optionally, the EM transducer(s) is operated over the time interval during which the electric vehicle is in motion relative to the EM transducer. During vehicle motion, the EM transducer(s) may operate in a multi-static configuration, where spatially separated transmit and receive elements capture electromagnetic backscatter data from multiple aspect angles.

Optionally, the EM transducer(s) operate in a multi-static radar configuration during vehicle motion. The EM transducer(s) may include a phased array antenna system, which may operate, for example, at 24 Gigahertz (GHz) and/or 77 GHz and/or other frequencies. The phased array system may be designed, for example, for beam steering and/or Doppler tracking.

Exemplary processing of the intercepted EM signals include:

1. Motion compensation using Kalman filtering of tracked vehicle trajectory.
2. Coherent integration across M measurement positions (e.g., M=10-50).
3. Multi-frequency fusion combining 24 GHz and/or 77 GHz returns.
4. Spatial diversity processing to enhance SNR by factor of VM.

Multiple datasets of the intercepted EM radiation may be computed during the time interval, optionally by performing synthetic aperture radar (SAR) processing. The phased array may be operated at about 24 gigahertz (GHz) and/or about 77 GHz for electronically scanning to automatically tracking the motion of the electric vehicle relative to the EM transducer. The SAR processing may be based on the tracking by the phased array.

Optionally, the datasets are processed by a motion-compensated imaging process for enhancing resolution of the datasets. Motion parameters may be monitored, for example acceleration, and angular displacement using integrated inertial measurement units (IMUs) and GPS positioning. Exemplary processing of the datasets include:

Compensating for motion-induced phase variations using tracked position data.

Aligning temporal measurements to spatial coordinates via interpolation.

Combining multi-aspect measurements to enhance spatial resolution beyond.

The motion-compensated imaging process may corrects for vehicle displacement, for example, by:

Tracking sensor position with high accuracy such as using IMU data (e.g., ±1, 2, 3 millimeters).

Interpolating measurements to fixed spatial grid.

Applying phase corrections for motion-induced Doppler shifts.

At least one field variation map may be computed by processing the datasets, optionally the datasets processed by the motion-compensated imaging process. The field variation map(s) may be included in the multi-dimensional dataset (e.g., the field variation map may be defined as a extracted feature that is included in the multi-dimensional dataset).

Electromagnetic field variation maps may be computed by measuring the complex impedance response Z(x, y, f) across the battery pack surface, where:

(x,y) denote spatial coordinates with 1 cm resolution.

f denotes frequency sweep from 1-100 kHz.

Z denotes magnitude and phase components.

The field variation map may quantify deviations from baseline impedance patterns established for battery packs of the same type (e.g., model, manufacturer) without anomalies. For example mathematically represented as:

$$\Delta Z(x, y, f) = |\text{Z\_measured}(x, y, f) - \text{Z\_baseline}(x, y, f)|$$

Exemplary features extracted from the field variation maps that may indicate the presence of anomalies indicators include:

Impedance magnitude variations>a first threshold (e.g., 10%, 20%) from baseline.

Phase angle shifts>a second threshold (e.g., 10, 15, 20°) indicating reactive component changes.

Frequency-dependent variations suggesting internal capacitance/inductance changes.

One or more actuators for moving the EM transducer(s) may be operated for maintaining the EM transducer(s) at a preselected distance from the electric vehicle during the motion. For example, a motor rotates the EM transducer and/or moves the EM transducer forward and/or backwards as the vehicle is moving past the EM transducer to maintain a constant distance between the EM transducer and the vehicle of about 50 centimeters.

A 3D reconstruction of at least the EV battery may be computed based on the datasets. Alternatively or additionally, a surface geometry model of the battery pack may be computed by correlating electromagnetic return signals with known vehicle motion trajectories. Alternatively or additionally, a multi-perspective electromagnetic signature database may be generated from the datasets, where each signature corresponds to a specific geometric viewing angle of the battery pack exterior. The surface geometry model may represent external surface topology with spatial resolution determined by the operating frequency and measurement geometry.

Alternatively or additionally, the acoustic transducer(s) is operated over the time interval during which the electric vehicle is in motion relative to the acoustic transducer(s). The motion of the vehicle may be selected for generating vibrations by the motion of the electric vehicle for exciting latent defects in the EV battery.

The acoustic transducer(s) may intercept the acoustic energy while the electric vehicle is in motion.

Features extracted from the acoustic energy intercepted while the electric vehicle is in motion may include the abnormal acoustic signatures described herein.

Alternatively or additionally, the thermal camera is operated over the time interval during which the electric vehicle is in motion relative to the thermal camera. Thermal images may be captured at multiple viewing angles based on the motion of the vehicle.

At 210, a multi-dimensional dataset may be generated by including and/or aggregating the features extracted from the intercepted EM energy and/or acoustic energy and/or thermal image(s). The multi-dimensional dataset may represent a combination of the extracted features.

Optionally, the multi-dimensional dataset is generated by concatenating the different extracted features into a single data structure.

The different extracted features may be represented as vectors. The multi-dimensional dataset may be generated by concatenating the different vectors.

Optionally, metadata of the vehicle is added to the multi-dimensional dataset. Examples of metadata include: vehicle manufacturer, year of manufacture, vehicle model, geographical location of manufacturing, and color.

Optionally, the features from the different sensing modalities are aggregated by computing new features based on a combination of the features from the different sensing modalities. The combination features may be included in the multi-dimensional dataset:

Spatial Aggregation: Using features from the different sensing modalities from multiple spatial locations within the vehicle, optionally within the EV battery. Regional averaging and variance calculations may be performed. Multi-scale feature pyramids may be computed.

Temporal Aggregation: Using multiple measurements of the different modalities over time. Statistical measures (e.g., mean, standard deviation, minimum, maximum) may be computed. Trend analysis vectors may be computed.

Cross-Modal Correlation: Feature correlation matrices between modalities may be computed. Normalized cross-correlation coefficients may be computed.

Mutual information features. Features of the different modalities which correspond to the same or similar parameters may be aggregated to increase the accuracy of the parameter.

At 212, the multi-dimensional dataset is fed into a machine learning model.

Exemplary architectures of the machine learning model(s) include, for example, one or more of: a detector architecture, a classifier architecture, and/or a pipeline combination of detector(s) and/or classifier(s), for example, statistical classifiers and/or other statistical models, neural networks of various architectures (e.g., convolutional, fully connected, deep, encoder-decoder, recurrent, transformer, graph), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised, and/or reinforcement learning. Machine learning models may be trained using supervised approaches and/or unsupervised approaches.

At 214, the machine learning may be trained. The machine learning model may be trained in advance of implementing the other features described with reference to FIG. 2, and/or may be dynamically updated after and/or during implementing the other features described with reference to FIG. 2.

The machine learning model may be trained on a training dataset of records. One or more records may be generated for each sample electric vehicles. A record includes the multi-dimensional dataset computed for a sample electric vehicle, computed for example, as described with reference to 202-210. The record may include a ground truth indicating whether the EV battery of the sample electric vehicle has an anomaly.

Alternatively or additionally, the record includes a baseline (e.g., first) timestamp indicating when the multi-dimensional dataset was generated. When the EV battery did not include an anomaly at the baseline timestamp (i.e., at the time of computation of the multi-dimensional dataset), and the EV battery developed an anomaly at a future time after the baseline timestamp, the record may include another timestamp indicating the future time when the anomaly developed in the EV battery. The baseline timestamp and/or future timestamp may be included in the record as ground truth, for predicting when a target batter that does not currently have an anomaly is predicted to develop the anomaly.

Additional exemplary details for training the machine learning model are described, for example, with reference to FIG. 3.

At 216, data may be analyzed to determine whether calibration of one or more of the sensing modalities is to be performed.

The data that is analyzed may include one or more of: the intercepted EM energy, the intercepted acoustic energy, the captured thermal images, the extracted feature (e.g., range of values of intercepted energy, average value of intercepted energy, distribution of intercepted energy), the output of the machine learning model such as the indication of anomaly and/or the confidence score (e.g., probability of accuracy) generated by the machine learning model, optionally relative to a threshold.

Optionally, the data captured by the imaging modalities (e.g., EM energy, acoustic energy, images of the vehicle (e.g., illuminated images) is analyzed to identify a region of the EV battery that is not captured in at least one thermal image and/or intercepted energy. The region may not be depicted in any of the thermal images and/or intercepted energy datasets. Alternatively or additionally, the thermal images and/or intercepted energy datasets of the EV battery are analyzed to identify a region of the EV vehicle that is not adequately depicted to enable a sufficiently accuracy analysis for detection of anomaly. For example, the acoustic energy transducer directed acoustic energy at the front half of the EV battery, such as that the back half of the EV battery did not reflect and/or transmit sufficient amount of acoustic energy to detect sounds indicative of an anomaly. Alternatively or additionally, the machine learning model generates a confidence score of detection of the anomaly below a threshold for the EV battery.

At 218, in response to determining that calibration is required, such as the confidence score generated by the machine learning model is below the threshold and/or one or more regions of the EV battery are insufficiently sensed by one or more sensing modalities, one or more of the sensing modalities may be calibrated and/or adjusted.

Exemplary calibrations and/or adjustments include adapting one or more of the following parameters of the sensing modalities:

- Increasing or decreasing the frequency of the transmitted energy (e.g., acoustic and/or EM).
- Increasing or decreasing the amplitude of the transmitted energy (e.g., acoustic and/or EM).
- Increasing or decreasing the field of view of the intercepted energy (e.g., acoustic and/or EM and/or thermal images).
- Operating one or more actuators for moving one or more of the sensing modalities (e.g., EM transducer, acoustic transducer, thermal camera), for example, moving along a plane and/or in three dimensional space, and/or changing view in one or more degrees.
- Adapting other parameter(s) of the EM transceiver, and/or the acoustic transceiver, and/or the thermal camera.

The calibration and/or adjustment may be performed according to a prediction that the region(s) of the EV battery will be better depicted by the sensing modalities after the calibration and/or adjustment.

The calibration and/or adjustment may be performed according to a prediction that the machine learning model will generate a confidence score above the threshold when fed the multi-dimensional dataset generated based on data sensed by the different sensing modalities after the calibration and/or adjustment.

The calibration and/or adjustment may be computed, for example, by a mapping dataset that maps the missing region(s) of the EV battery, inadequately sensed region(s) of the EV battery, and/or low confidence score of the prediction by the machine learning model, to an adjustment of the parameters of the sensing modalities. The mapping dataset may be implemented as, for example, a set of rules, a deterministic process, and/or another machine learning model trained on a training dataset of an indication of the missing region(s) of the EV battery, inadequately sensed region(s) of the EV battery, and/or multi-dimensional dataset associated with low confidence score (e.g., below the threshold), and a ground truth of the adjustment of the parameters that provided coverage of the missing region(s) of the EV battery, inadequately sensed region(s) of the EV battery, and/or increased the confidence score above the threshold.

The calibration and/or adjustment may be iterated until a confidence score of the detection of the anomaly of the EV battery by the machine learning model exceeds a threshold and/or until the entire volume of the EV battery is adequately sensed by the sensing modalities.

Alternatively or additionally, the adjustment and/or calibration may be performed as a predetermined process in order to fully adequately image the EV battery. A scanning process may cover the volume of the EV battery in overlapping patterns to ensure complete coverage and/or eliminate blind spots. Actuators (e.g., positioning mechanisms) associated with the sensing modalities may adjust for vehicle geometry, for maintaining optimal measurement conditions throughout the analysis process.

At 220, an indication of an anomaly in the EV battery is generated by the machine learning model. The indication of the anomaly is obtained from the machine learning model, for example, by accessing a region in a memory and/or data storage device where the machine learning model stores the generated result.

Exemplary anomalies detected by machine learning model include:

- Cell imbalances, for example: Voltage disparities between cells creating detectable impedance variations
- Connection failures, for example: Loose bus bars, corroded terminals, broken welds
- Internal short circuits, for example: Creating abnormal current paths and field distortions
- Electrolyte degradation, for example: Changes in ionic conductivity affecting EM propagation
- Mechanical stress, for example: Cell swelling, separator damage, internal pressure buildup
- Thermal runaway precursors, for example: Gas generation, electrolyte boiling
- Structural defects, for example: Cracked housings, loose mounting hardware
- Arcing/sparking, for example: High-frequency acoustic emissions from electrical faults
- Hot spots, for example: Individual cells with elevated internal resistance
- Cooling system failures, for example: Blocked channels, pump malfunctions
- Thermal runaway, for example: Cascading cell heating patterns
- Uneven heat distribution, for example: Indicating poor thermal management Alternatively or additionally, the machine learning model generates a prediction for a future time interval during which the EV battery is predicted to develop the anomaly requiring service and/or replacement, Alternatively or additionally, the machine learning model generates a risk of failure of the EV battery. The risk of failure may be a probability, for example, about 50%, or 70%, or 90%, and the like. The risk of failure may be associated with the future time interval. For example, about 50% risk of failure in about 6 months, 70% risk of failure in 12 months, and 90% risk of failure in 24 months.

At 222, one or more automated actions may be implemented in response to machine learning model detecting that the EV battery has an anomaly, or is predicted to develop the anomaly at the future time interval.

Exemplary automated actions include:

- In response to a screening performed by the machine learning model that indicates that the EV battery is suspected of having an anomaly, another contact-based test may be performed on the EV battery to confirm the anomaly and/or provide a more comprehensive anomaly test. The contact-based test may be automatically performed (e.g., by a robot). The contact-based test may be automatically scheduled, for example, an appointment is automatically scheduled by a computer of a test center, and/or a message of the appointment is sent to a client terminal, which may be automatically inserted into an electronic appointment application.
- In response to the machine learning model indicating that the EV battery currently has an anomaly, a replacement EV battery may be automatically ordered. The order may be placed for replacement as soon as possible.
- In response to the machine learning model indicating that the EV battery is predicted to develop the anomaly at the future time interval, the replacement EV battery may be ordered for availability at or prior to the future time interval.
- In response to the machine learning model indicating that the EV battery currently has an anomaly, a service appointment for the EV battery may be automatically scheduled. The appointment may be made as soon as possible.
- In response to the machine learning model indicating that the EV battery is predicted to develop the anomaly at the future time interval, the service appointment for the EV battery may be automatically scheduled at or prior to the future time interval.

In response to machine learning model indicating that the EV battery does not current have an anomaly and/or is not predicted to develop the anomaly, a future EV battery screening session may be automatically scheduled, and/or a replacement EV battery may be ordered for replacement according to the manufacturer recommended interval.

The appointment may be generated, for example, as a message and/or metadata, for automatically adding a slot to an electronic scheduler running on a mobile device of a user. The appointment may be generated using other approaches, for example, as an email sent to an email address of the user, and/or as a short message service (SMS) message sent to a phone number of the user, and the like.

At 224, data may be provided, for example, for presentation on a display, forwarding to another device (e.g., server, mobile device), storage on a data storage device (e.g., electronic record, computing cloud, hard-drive), feeding into another executing process, and the like.

For example, the indication of whether the anomaly was detected, not detected, or predicted to develop, may be provided, such as presented on a display. Other data may be presented on the display, for example, temperature patterns across the EV battery and/or surface thereof, and/or other extracted features. The user may select specific extracted features for presentation on the display, for example, using a graphical user interface (GUI) that presents a list of extracted features fed into the ML model. The selected features is presented on the display.

Referring now back to FIG. 3, features described with reference to 302-314 may be implemented for creating a single record based on data collected from a sample EV battery of a sample electric vehicle.

At 302, multiple sensing modalities are operated for generating energy towards the sample EV batter of the sample electric vehicle.

Optionally, the EM transducer(s) is operated for generating EM radiation towards the sample EV battery of the sample electric vehicle.

Alternatively or additionally, the acoustic transducer(s) is operated for generating acoustic energy towards the sample EV battery.

Additional exemplary details of operating the sensing modalities are described, for example, with reference to 202 of FIG. 2.

At 304, energy (e.g., signals) are intercepted and/or captured.

Optionally, the EM transducer(s) are operated for intercepting EM radiation reflected off the sample EV battery and/or passing through the sample EV battery.

Alternatively or additionally, the acoustic transducer(s) are operated for intercepting acoustic energy reflected off the sample EV battery and/or passing through the sample EV battery.

Alternatively or additionally, a thermal camera(s) is operated for capturing a thermal image(s) of the EV battery of the sample vehicle.

Additional exemplary details of intercepting and/or capturing energy are described, for example, with reference to 204 of FIG. 2.

At 306, multiple features are extracted from the intercepted EM radiation, the acoustic energy, and/or the thermal image(s).

Additional exemplary details of extracting features are described, for example, with reference to 206 of FIG. 2.

At 308, one or more features described with reference to 302-306 are iterated. The iterations may be performed while the sample vehicle is in motion with respect to the sensing modalities. The iterations may be performed for sensing the EV battery at different parameters of the sensing modalities, such as different frequencies, different views, and the like. A respective set of features may be extracted during each iteration.

Additional exemplary details of the iterations are described, for example, with reference to 208 of FIG. 2.

At 310, a multi-dimensional dataset may be created from the extracted features.

A respective multi-dimensional dataset may be created by extracting features during each iteration. Alternatively, the multi-dimensional dataset is created by extracted features from multiple iterations.

Additional exemplary details of the generating the multi-dimensional dataset are described, for example, with reference to 210 of FIG. 2.

At 312, a ground truth may be defined for the record.

The ground truth may be an indication of whether the sample EV battery of the sample electric vehicle has an anomaly or not.

The ground truth may be represented as, for example, one or more of:

- A binary classification category, such as anomaly or no anomaly.
- Multiple classification categories, for example, severity of anomaly (e.g., mild, medium, severe), type of anomaly, and the like.
- A discrete numerical value on a scale, for example, from 0 to 10.
- A continuous numerical value on a scale.

When there is no current anomaly at the time when the sensing by the multiple sensing modalities is performed (and the multi-dimensional dataset is created) but an anomaly developed at a future time, the ground truth may further include a baseline timestamp indicating when the multi-dimensional dataset was generated (i.e., when the multiple sensing modalities were operated for sending the sample EV battery) and another timestamp indicating when the anomaly developed in the sample EV battery.

At 314, a record is defined (e.g., created) for the sample EV battery of the sample car. The record may include the multi-dimensional dataset and the ground truth.

At 316, features described with reference to 302-314 may be iterated. Multiple records may be created based on the multiple iterations.

At 318, one or more training datasets may be created. Each training dataset includes multiple records created as described herein.

Optionally, a single training dataset is created for different types of electric vehicles and/or different types of EV batteries and/or different types of anomalies and/or at different geographical locations and/or other parameters (e.g., metadata).

Alternatively, one or more different specialized training datasets may be created, by selecting including certain records, for example, for electric vehicles serviced at a specific geographical location, for a specific manufacturer of electric vehicles, for a specific model of an electric vehicle, for a specific type of EV battery, for a specific type of anomaly, for another specific parameter, and the like.

At 320, a machine learning model is trained on the training dataset. In the case of multiple different training datasets, multiple different machine learning models may be trained on the different training datasets. A specific training dataset may be selected according to the specific para meter(s) of the electric vehicle.

The trained machine learning model(s) is provided, for example, stored on a server and made accessible by remote client terminals for centralized analysis, provided to remote devices for localized analysis, and the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning models will be developed and the scope of the term machine learning model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for non-destructive contact-less evaluation of an electric vehicle (EV) battery of an electric vehicle, comprising:

at least one electromagnetic (EM) transducer configured for generating EM radiation and for intercepting the EM radiation;

at least one acoustic transducer configured for generating acoustic energy towards the EV battery and for intercepting the acoustic energy reflected off the EV battery or passing through the EV battery;

at least one thermal camera;

a data interface configured to access and/or receive the intercepted EM radiation and the intercepted acoustic radiation; and at least one processor configured for:

operating the at least one EM transducer and the at least one acoustic transducer for generating EM radiation and acoustic energy towards the EV battery;

operating the at least one EM transducer, and the at least one acoustic transducer for intercepting EM radiation and acoustic energy reflected off the EV battery and/or passing through the EV battery;

operating the at least one thermal camera for capturing at least one thermal image of the vehicle;

extracting a plurality of features from the intercepted EM radiation, the acoustic energy, and the at least one thermal image;

generating a multi-dimensional dataset by aggregating the plurality of features;

feeding the multi-dimensional dataset into a machine learning model;

obtaining from the machine learning model, an indication of an anomaly in the EV battery; operating the at least one EM transducer over a time interval during which the electric vehicle is in motion relative to the at least one EM transducer;

computing a plurality of datasets of the intercepted EM radiation during the time interval by performing synthetic aperture radar (SAR) processing; and computing at least one field variation map by processing the plurality of datasets, wherein the plurality of features for generating the multi-dimensional dataset include the at least one field variation map.

2. The system of claim 1, wherein the at least one processor is further configured for:

in response to the EV battery having the anomaly, at least one of: automatically ordering a replacement EV battery, automatically scheduling a service appointment for the EV battery, and performing at least one additional evaluation of the EV battery based on electrical and/or mechanical contact with the EV battery.

3. The system of claim 1, wherein the at least one processor is further configured for:

in response to the EV battery not having the anomaly, automatically scheduling a future EV battery screening session.

4. The system of claim 1, wherein the machine learning model generates a risk of failure of the EV battery.

5. The system of claim 1, wherein the machine learning model generates a prediction for a future time interval during which the EV battery is predicted to develop the anomaly requiring service or replacement, and at least one of: automatically ordering the replacement EV battery for availability at or prior to the future time interval, and automatically scheduling the service appointment for the EV battery at or prior to the future time interval.

6. The system of claim 1, further comprising training the machine learning model on a training dataset of a plurality of records generated for a plurality of sample electric vehicles, wherein a record includes the multi-dimensional dataset computed for a sample electric vehicle, and a ground truth indicating whether the EV battery of the sample electric vehicle has the anomaly.

7. The system of claim 6, wherein the ground truth of the record further includes a first timestamp indicating when the multi-dimensional dataset was generated and when the EV battery did not include an anomaly at the first timestamp, including a second timestamp indicating a future time when the anomaly developed in the EV battery.

8. The system of claim 1, wherein the at least one processor is further configured for:

operating a phased array at about 24 gigahertz (GHz) and 77 GHz for electronically scanning to automatically tracking the motion of the electric vehicle relative to the at least one EM transducer, wherein the SAR processing is based on the tracking by the phased array;

operating an actuator configured for moving the at least one EM transducer for maintaining the at least one EM transducer at a preselected distance from the electric vehicle during the motion;

processing the plurality of datasets by a motion-compensated imaging process for enhancing resolution of the plurality of datasets; and computing a 3D reconstruction of at least the EV battery based on the plurality of datasets.

9. The system of claim 1, wherein the plurality of features extracted from the intercepted acoustic energy include abnormal acoustic signatures extracted by an AI pattern recognition model.

10. The system of claim 1, wherein the plurality of features extracted from a plurality of thermal images include temperature patterns correlated with risk of failure of the EV battery.

11. The system of claim 1, wherein the anomaly, detected by analyzing the intercepted EM radiation, is selected from: internal cell imbalances and/or connection failures.

12. The system of claim 1, wherein the at least one EM transducer is configured for generating low frequency EM radiation selected for penetrating a pack casing of the EV battery.

13. The system of claim 12, wherein the generated EM radiation is in a range of about 1-100 kiloHertz (kHz).

14. The system of claim 1, wherein the at least one acoustic transducer is configured for generating acoustic energy selected for detecting battery stress sounds due to battery cell anomalies.

15. The system of claim 14, wherein the at least one acoustic transducer is configured for generating acoustic energy in a range of about 20-100 kHz.

16. The system of claim 1, further comprising calibrating at least one of: the at least one EM transducer, the at least one acoustic transducer, and the at least one thermal camera, for increasing a confidence score of the anomaly detected by the machine learning model above a threshold.

17. A system for non-destructive contact-less evaluation of an electric vehicle (EV) battery of an electric vehicle, comprising:

at least one electromagnetic (EM) transducer configured for generating EM radiation and for intercepting the EM radiation;

at least one acoustic transducer configured for generating acoustic energy towards the EV battery and for intercepting the acoustic energy reflected off the EV battery or passing through the EV battery;

at least one thermal camera;

a data interface configured to access and/or receive the intercepted EM radiation and the intercepted acoustic radiation; and at least one processor configured for:

operating the at least one EM transducer and the at least one acoustic transducer for generating EM radiation and acoustic energy towards the EV battery;

operating the at least one EM transducer, and the at least one acoustic transducer for intercepting EM radiation and acoustic energy reflected off the EV battery and/or passing through the EV battery;

operating the at least one thermal camera for capturing at least one thermal image of the vehicle;

extracting a plurality of features from the intercepted EM radiation, the acoustic energy, and the at least one thermal image;

generating a multi-dimensional dataset by aggregating the plurality of features;

feeding the multi-dimensional dataset into a machine learning model;

obtaining from the machine learning model, an indication of an anomaly in the EV battery; and operating the at least one acoustic transducer over a time interval during which the electric vehicle is in motion relative to the at least one acoustic transducer, for generating vibrations by the motion of the electric vehicle for exciting latent defects in the EV battery, wherein the at least one acoustic transducer intercepts the acoustic energy while the electric vehicle is in motion, wherein the plurality of features extracted from the acoustic energy intercepted while the electric vehicle is in motion include abnormal acoustic signatures.

18. A system for non-destructive contact-less evaluation of an electric vehicle (EV) battery of an electric vehicle, comprising:

at least one electromagnetic (EM) transducer configured for generating EM radiation and for intercepting the EM radiation;

at least one acoustic transducer configured for generating acoustic energy towards the EV battery and for intercepting the acoustic energy reflected off the EV battery or passing through the EV battery;

at least one thermal camera;

a data interface configured to access and/or receive the intercepted EM radiation and the intercepted acoustic radiation; and at least one processor configured for:

operating the at least one EM transducer and the at least one acoustic transducer for generating EM radiation and acoustic energy towards the EV battery;

operating the at least one EM transducer, and the at least one acoustic transducer for intercepting EM radiation and acoustic energy reflected off the EV battery and/or passing through the EV battery;

operating the at least one thermal camera for capturing at least one thermal image of the vehicle;

extracting a plurality of features from the intercepted EM radiation, the acoustic energy, and the at least one thermal image;

generating a multi-dimensional dataset by aggregating the plurality of features;

feeding the multi-dimensional dataset into a machine learning model;

obtaining from the machine learning model, an indication of an anomaly in the EV battery; and operating the at least one thermal camera over a time interval during which the electric vehicle is in motion relative to the at least one thermal camera for capturing a plurality of thermal images at a plurality of viewing angles, wherein the plurality of features extracted from the plurality of thermal images include detected hot spots indicative of identified cells of the EV battery with high internal resistance.

19. A system for training a machine learning model, comprising:

at least one electromagnetic (EM) transducer configured for generating EM radiation and for intercepting the EM radiation;

at least one acoustic transducer configured for generating acoustic energy towards an EV battery installed within a vehicle and for intercepting the acoustic energy reflected off the EV battery or passing through the EV battery;

at least one thermal camera;

a data interface configured to access and/or receive the intercepted EM radiation and the intercepted acoustic radiation; and at least one processor configured for:

generating training dataset comprising a plurality of records for a plurality of sample vehicles each with a sample EV battery installed therein, each record generated by:

operating the at least one EM transducer and the at least one acoustic transducer for generating EM radiation and acoustic energy towards the sample EV battery;

operating the at least one EM transducer, and the at least one acoustic transducer for intercepting EM radiation and acoustic energy reflected off the sample EV battery or passing through the sample EV battery;

operating the at least one thermal camera for capturing at least one thermal image of the sample vehicle;

extracting a plurality of features from the intercepted EM radiation, the acoustic energy, and the at least one thermal image;

generating a multi-dimensional dataset by aggregating the plurality of features; and defining a ground truth indicating whether the sample EV battery of the sample electric vehicle has an anomaly or not; and training a machine learning model on the training dataset, wherein the:

sample vehicle is in motion with respect to the at least one EM transducer, the at least one acoustic transducer, and the at least one thermal camera.

20. The system of claim 19, wherein the ground truth of the record further includes a first timestamp indicating when the multi-dimensional dataset was generated and a second timestamp indicating when the anomaly developed in the sample EV battery.

21. The system of claim 19, wherein the ground truth of the record further includes a first timestamp indicating when the multi-dimensional dataset was generated and when the EV battery did not include an anomaly at the first timestamp, including a second timestamp indicating a future time when the anomaly developed in the EV battery.

* * * * *